United States Patent [19]

Abe et al.

[11] Patent Number: 5,761,164
[45] Date of Patent: Jun. 2, 1998

[54] GAIN CONTROL DEVICE FOR SERVO CONTROL

[75] Inventors: Hiroyuki Abe; Kazuhiro Kiyoura; Yoshifumi Fujino; Koichiro Haraguchi; Kazushige Kawana; Takehiro Takada; Seiji Kato, all of Kawagoe, Japan

[73] Assignee: Pioneer Electronic Corporation, Tokyo-to, Japan

[21] Appl. No.: 336,840

[22] Filed: Nov. 9, 1994

[30] Foreign Application Priority Data

Nov. 15, 1993 [JP] Japan ................. 5-285351
Nov. 15, 1993 [JP] Japan ................. 5-285352

[51] Int. Cl.⁶ .................................. G11B 7/085
[52] U.S. Cl. .................. 369/44.36; 369/44.25; 369/44.29; 369/44.32
[58] Field of Search ................ 369/44.36, 44.25, 369/44.32, 44.29, 44.35, 44.34, 54, 36, 38; 250/201.5

[56] References Cited

U.S. PATENT DOCUMENTS

| | | | |
|---|---|---|---|
| 4,740,679 | 4/1988 | Doi | 369/44.25 X |
| 4,878,211 | 10/1989 | Suzuki et al. | 369/44.35 |
| 4,982,392 | 1/1991 | Soejima | 369/44.25 |
| 5,014,256 | 5/1991 | Horie et al. | 369/44.35 |
| 5,293,365 | 3/1994 | Rokutan | 369/44.36 X |
| 5,347,501 | 9/1994 | Iimura | 369/44.35 |

Primary Examiner—Thang V. Tran
Attorney, Agent, or Firm—Kane,Dalsimer,Sullivan, Kurucz, Levy, Eisele and Richard, LLP

[57] ABSTRACT

An automatic gain control device includes: reading unit for reading information signal from a recording medium; servo loop including servo control unit for controlling position of the reading unit with respect to the recording medium; mixing unit for mixing a disturbance signal into the servo loop; gain control unit detecting gain of the servo loop in accordance with level of the disturbance signal and varying the gain of the servo loop; and level detecting unit for discriminating whether level of the information signal read by the reading unit is higher than a predetermined level or not, wherein the mixing unit mixes the disturbance signal into the servo loop when the level of the information signal is higher than the predetermined level.

9 Claims, 14 Drawing Sheets

PRIOR ART

PRIOR ART

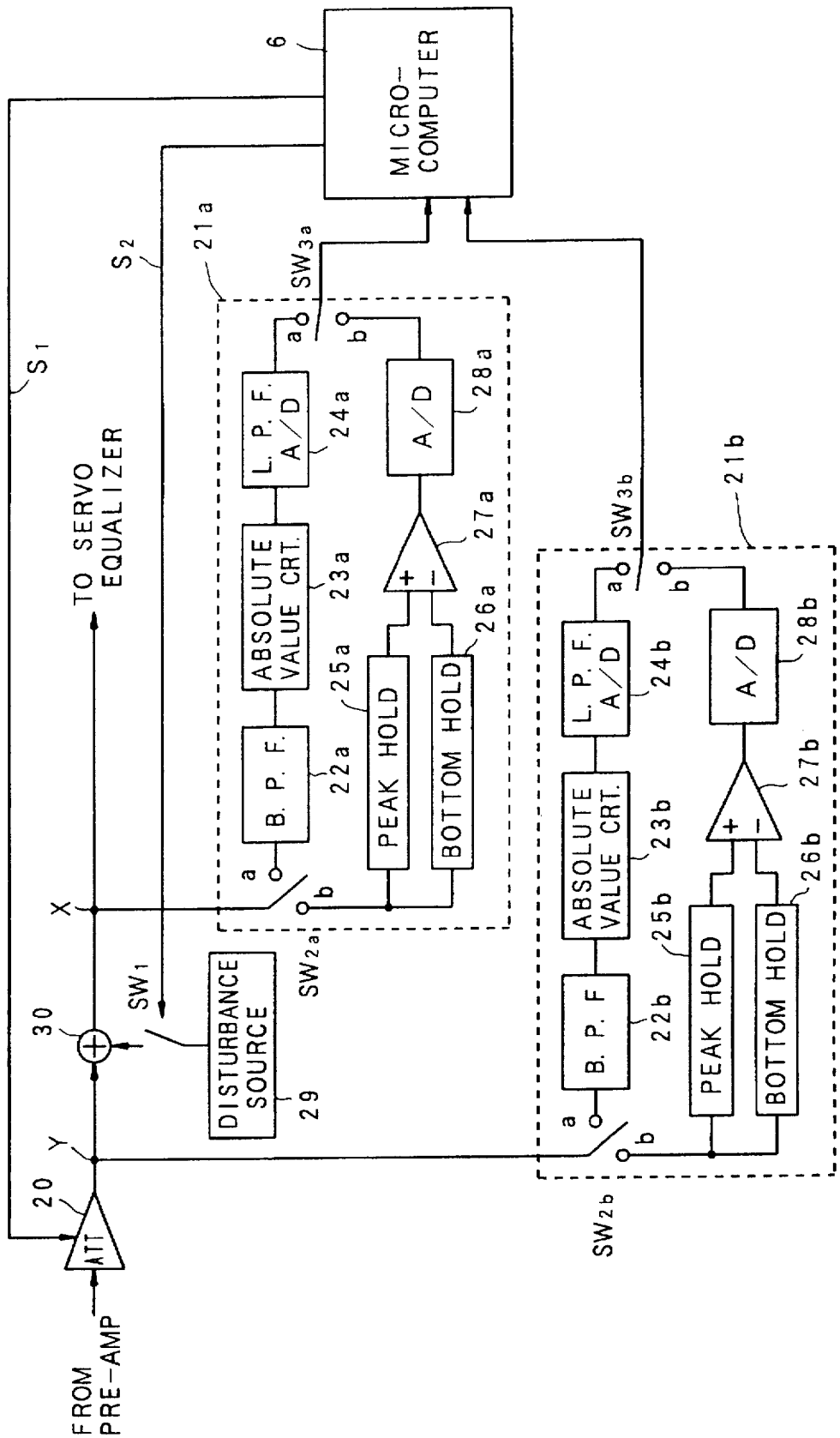

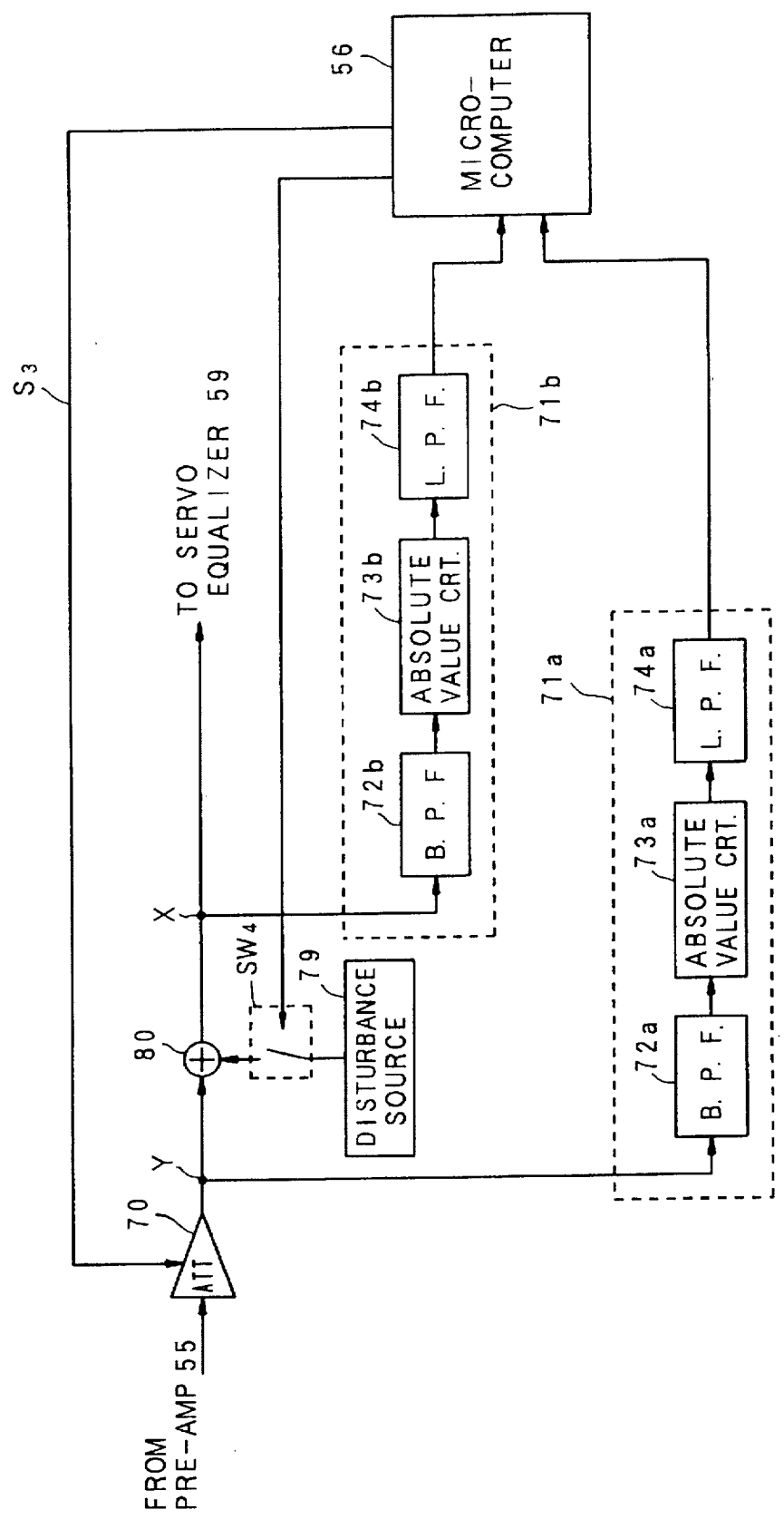

GAIN CONTROL DEVICE FOR SERVO CONTROL

BACKGROUND OF THE INVENTION

1. Field of the Invention

This invention relates to a servo control device, and more particularly to a gain control technique for a servo control device installed in an optical information recording and reproducing device.

2. Description of the Prior Art

Normally, in a device for recording or reproducing information on or from a disc such as a Compact Disc or a Laser Disc, servo control is very important for accurately reading out information recorded on a disc. Servo control circuit generally includes a closed servo loop for feeding back information relating to a relative speed of a pickup for reading information with respect to the disc, information relating to a position of the pickup with respect to tracks or information relating to focusing condition of objective lens. In such a servo control technique, an error signal is generated based on a read-out signal from pickup, and it is necessary to control gain of the servo loop so that error signal becomes an appropriate voltage level. For this reason, an automatic gain control circuit is frequently provided in a servo control device. Recently, some types of automatic gain control circuits have been proposed. One of automatic gain control circuits detects magnitude level of an error signal and carries out gain control so that error signal supplied to a servo equalizer circuit becomes an appropriate magnitude level. However, in use of such a circuit, gain of servo loop largely varies, due to characteristic differences of individual pickups or circuits and/or temperature characteristics, after the servo loop is closed, and therefore gain control cannot be accurately performed. In this view, an automatic gain control utilizing disturbance source is advantageous. In such gain control, disturbance signal having a given magnitude level and a given frequency is mixed into servo loop, and disturbance signal traveled through servo loop is picked up and its magnitude level is detected, with a delay time, so as to detect a loop gain peculiar to the servo loop including a disc. Then, level of error signal is varied by an attenuator or the like to be an appropriate level for a following servo equalizer.

In a known automatic gain control device, gain control described above is carried out in a certain time period prior to reproduction of disc. In an automatic gain control device utilizing disturbance source, a pickup mechanically fluctuates dependent upon the disturbance signal after mixing the same. However, disturbance signal is of audible frequency and is mixed into servo loop prior to reproduction of audio information (i.e., no music period), and hence disturbance signal may leak in audio information to be reproduced and sensed by listener as discordant and uncomfortable noise. This is illustrated in FIG. 1. As illustrated in FIG. 1, a disc is set in a reproduction device at time $t_1$, and the focus servo is closed at time $t_2$ so that a light beam from an pickup is focused on a track by an object lens. At time $t_3$, tracking servo loop is closed and the pickup starts following the tracks. When the focus servo control and the tracking servo control are completed, automatic gain control commences. However, during the automatic gain control soon after the time $t_3$, MUTE signal is effective and no audio information is output. Namely, no music is reproduced before searching a head portion of music to be reproduced, and in this period disturbance signal is audible as discordant noise.

FIG. 2 is a diagram illustrating a relation between a position of an objective lens with respect to a pickup and a level of error signal. In FIG. 2, X-axis represents a deviation, i.e., an offset, measured from a lens-center which is a center of a lens movable range on a pickup, and Y-axis represents a level of tracking error signal. Namely, FIG. 2 illustrates variation of tracking error signal corresponding to position of lens. As seen from FIG. 2, level of tracking error signal largely varies depending on an offset from lens-center, and therefore a servo control device is required to have an automatic gain control function for absorbing variation. In an automatic gain control device, gain control is performed with no dependency upon position of lens relative to pickup. In consideration of the fact that level of error signal varies dependent upon offset from lens-center, there is developed a gain control device which arithmetically operates an appropriate gain control value from variation amount. Since variation amount is peculiar to individual discs, gain control value may be decided for respective discs. A technique of this kind is disclosed in a Japanese Patent Application Laid-Open No. 4-289520.

However, an automatic gain control device described above has the following problems. Firstly, in normal reproduction, since the pickup is positioned at an appropriate position by tracking servo control, central position of pickup rarely deviates from a target track of disc and a lens actuator corrects only very slight positional deviation of lens due to eccentricity of disc or the like. Namely, lens rarely moves largely to the extent of lens movable range, and is positioned within a narrow appropriate range (e.g., the range A in FIG. 2) near the lens-center by servo control. In other words, in normal reproduction, lens moves only within a narrow range in the vicinity of lens-center. However, in a special operation such as track jump, jumping access or the like, pickup jumps to a target track and then positioned by servo control. In this case, while pickup jumps and moves to a correct tracking position according to carriage control, lens moves largely within its movable range by fine position control, and may be positioned at an area other than an appropriate area near lens-center (e.g., range B in FIG. 2). In this situation, since level of error signal is low as shown, gain of an amplifier provided in gain control device should be increased for correctly performing servo control. However, in a normal reproduction, the pickup is positioned near lens-center and therefore loop gain set at position with large offset (largely deviated from lens-center, e.g., range B) is so high that error signal of appropriate level cannot be supplied to servo system. As a result, correct servo control cannot be performed. In addition, if carriage servo is unstable, lens temporarily stays near inner or outer edge of lens movable range, that is, shifted from lens-center. Normally, gain control is performed within a necessary and sufficient gain valuable range, and hence an automatic gain control device cannot set correct gain if lens is shifted in the above manner. This deteriorates servo characteristics and may result in a drop of product quality.

Generally, if position of pickup deviates from lens-center, level of tracking error signal asymmetrically varies. Therefore, in a reproduction of disc having relatively large eccentricity, error signal level largely varies during movement of carriage because lens rarely stays near lens-center, and hence control is unstable. Further, if loop gain is controlled irrespective of lens position in a case of disc having large eccentricity, loop gain is adjusted so that randomly detected tracking error level becomes appropriate level. Therefore, gain adjustment may be erroneous. The above description relates to problems in tracking servo control, however, there exists a similar problem in focus servo control. Namely, if lens position on pickup deviates from lens-center. sensitivity of lens varies. Therefore, if gain adjustment is carried out at an arbitrary position of disc having relatively large eccentricity, variation of controlled gain become large.

SUMMARY OF THE INVENTION

It is an object of the present invention to provide a gain control device capable of performing automatic gain control without allowing disturbance signal component to leak to reproduced audio signal and to be heard by listener as noise.

It is another object of the present invention to provide a gain control device capable of stable automatic gain control with less adjustment error resulting from positional variation of lens.

According to one aspect of the present invention, there is provided an automatic gain control device including: reading unit for reading information signal from a recording medium; servo loop including servo control unit for controlling position of the reading unit with respect to the recording medium; mixing unit for mixing a disturbance signal into the servo loop; gain control unit for detecting gain of the servo loop in accordance with level of the disturbance signal and varying the gain of the servo loop; and level detecting unit for discriminating whether level of the information signal read by the reading unit is higher than a predetermined level or not, wherein the mixing unit mixes the disturbance signal into the servo loop when the level of the information signal is higher than the predetermined level.

According to another aspect of the present invention, there is provided an automatic gain control device including: reading unit for reading information signal from a recording medium; lens movably provided on the reading unit; servo loop including servo control unit for controlling position of the reading unit and the lens with respect to the recording medium; position detecting unit for detecting relative position of the lens with respect to center of movable range of the lens on the reading unit; and gain control unit for detecting and varying the gain of the servo loop, wherein the gain control unit controls the gain of the servo loop when the position detecting unit detects that the lens is positioned within a predetermined range defined from the center of the movable range of the lens.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 4 is a block diagram illustrating a construction of the automatic gain control block shown in FIG. 3;

FIG. 9 is a block diagram illustrating a construction of the automatic gain control block shown in FIG. 8;

DESCRIPTION OF THE PREFERRED EMBODIMENTS

Preferred embodiments of the present invention will be described below with reference to the accompanying drawings.

1st Embodiment

Figure 3:
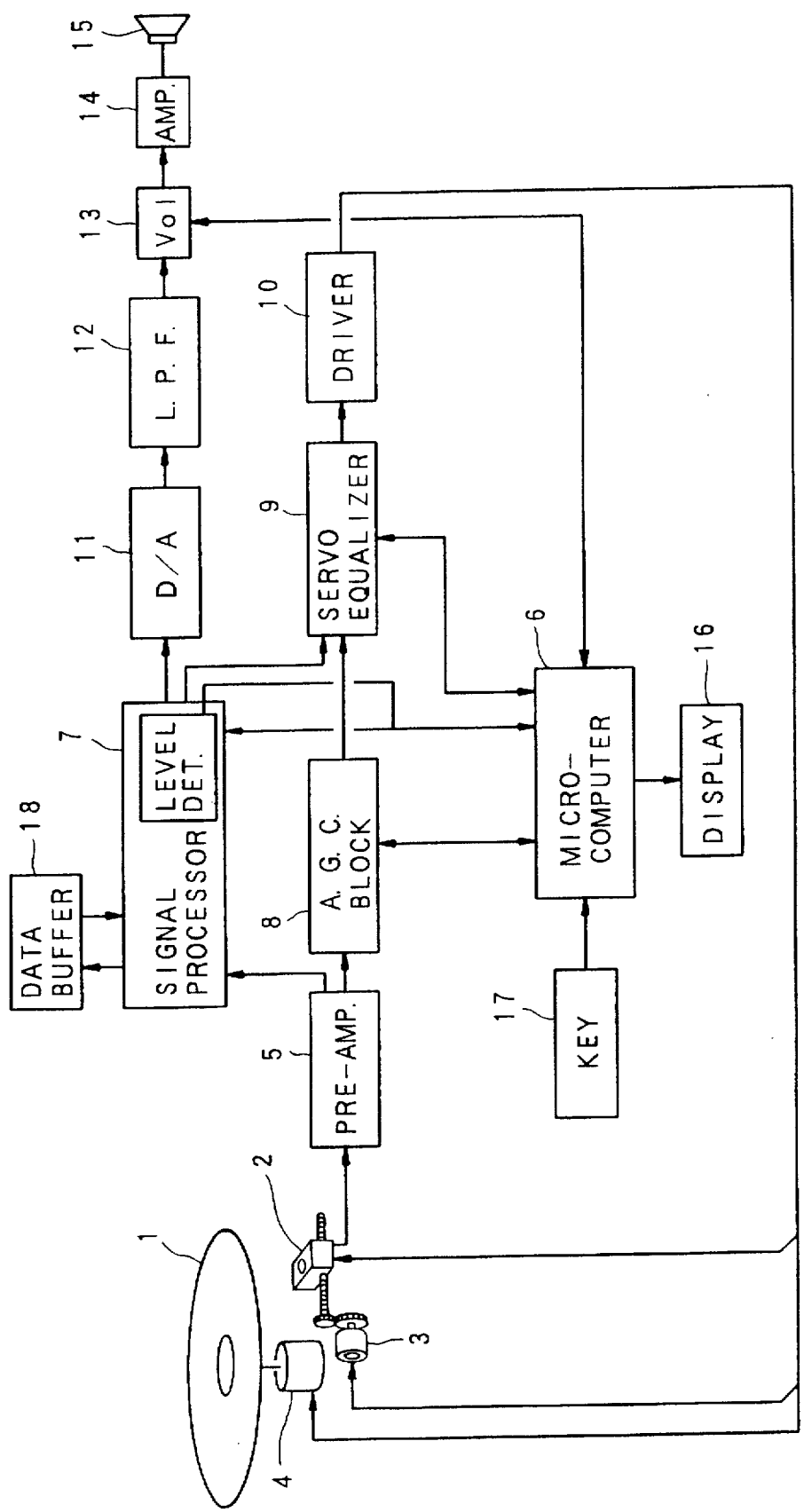
FIG. 3 is a block diagram illustrating components relating to servo system of a CD player according to the first embodiment.

According to the first embodiment, a CD player detects level of audio information to be reproduced using a signal processing circuit, and starts automatic gain control when the audio level exceeds a predetermined volume level FIG. 3 is a block diagram illustrating components relating to servo system according to the first embodiment.

The CD player for reproducing a disc 1 includes a pickup 2, a carriage motor 3, a spindle motor 4, a pre-amplifier 5, a signal processor 7, an audio level detector 7a, a D/A converter 11, a low-pass filter (LPF) 12, a volume 13, an amplifier 14, a speaker 15 and a data buffer 18. These components mainly relate to audio signal demodulation. The disc 1 is a recording medium on which signal is recorded, and the pickup 2 reads out signal from information tracks on the disc 1 via an objective lens (not shown). The carriage motor 3 transfers the pickup 2 in a radial direction of the disc 1, and the spindle motor 4 rotates the disc 1. The pre-amplifier 5 amplifies a signal read-out by the pickup 2, and outputs a focus error signal and a tracking error signal in addition to a binary RF signal. The signal processor 7 generates a CLV signal for controlling linear velocity of the spindle motor 4 based on the binary RF signal, carries out EFM modulation and error correction according to CIRC (Cross Interleave Reed-Solomon Code) onto the RF signal to produce 16-bits digital signal, and supplies it to the D/A converter 11. Further, the signal processor 7 is connected to the data buffer 18 to read and write data in and from the data buffer 18. The audio level detector 7a is provided in the signal processor 7 and detects the level of the digital audio data and supplies the detected signal to the micro-computer 6. The D/A converter 11 converts the 16-bits digital signal to an analog signal, and the low-pass filter 12 eliminates noise component from the analog signal and passes only audio signal of audible frequency. The volume 13 is controlled by the micro-computer 6 to change the volume level of audio signal to be output. The amplifier 14 carries out power amplification of audio signal and the speaker 15 converts the audio signal into acoustic sound.

The CD player further includes an automatic gain control block 8, a servo equalizer 9, a driver 10, a micro-computer 6, a key 17 and a display 16. These components function servo control. The automatic gain control block 8 varies levels of the error signals supplied from the pre-amplifier 5 to be predetermined signal levels suitable for the servo control, and the servo equalizer 9 adjusts frequency for servo control. The driver 10 carries out current-amplification of the drive signals generated, and drives focus and tracking coils (not shown) in the pickup 2, the carriage motor 3 and the spindle motor 4. The micro-computer 6 controls whole system. The key 17 receives instructions to control the micro-computer 6 from user, and the display 16 represents condition in a similar manner. The object lens of the pickup 2 is driven by the tracking coil in the radial direction of the disc, and driven by the focus coil to perform focus control By these servo controls, the pickup 2 is positioned to accurately receive read-out light from the disc 1 and supplies the light to a photo-detecting unit (not shown).

FIG. 4 is a block diagram illustrating a construction of the automatic gain control block 8. The automatic gain control block 8 varies the levels of the error signals supplied from the pre-amplifier 5 to be appropriate for the servo equalizer 9. The automatic gain control block 8 includes an attenuator 20, a gain detecting block 21a, a gain detecting block 21b, a disturbance source 29 and an adder 30. The attenuator 20 varies levels of the error signals on the basis of an attenuator control signal $S_1$ supplied from the micro-computer 6. The attenuator control signal $S_1$ includes gain control signal, and the micro-computer 6 supplies a gain control signal to the attenuator 20 by the attenuator control signal $S_1$. The gain detecting block 21a receives the output of the attenuator 20 from the terminal point Y positioned between the attenuator 20 and the adder 30, and detects the level of the error signal, including disturbance signal, which has traveled through the servo loop shown in FIG. 3. The adder 30 adds the disturbance signal generated by the disturbance source 29 to the output from the attenuator 20. The gain detecting block 21b receives the output of the adder 30, and detects levels of the error signals immediately after mixing the disturbance signal. The disturbance source 29 generates disturbance signal having pseudo-constant value (e.g., oscillation signal having constant frequency and constant magnitude level) to be added to the error signal, and supplies the disturbance signal to the adder 30 via the switch $SW_1$ switched by the micro-computer 6. The gain detecting block 21a includes a Band-Pass Filter (BPF) 22a, an absolute value calculating circuit 23a, a Low-Pass Filter unit (LPF) 24a, a peak-hold circuit 25a, a bottom-hold circuit 26a, a differential amplifier 27a, an A/D converter 28a and switches $SW_{2b}$ and $SW_{3b}$. The band-pass filter 22a extracts signal having frequency of the disturbance signal component, and the absolute value calculating circuit 23a produces absolute value signal. The LPF unit 24a eliminates signal having frequency of the disturbance signal to produce D.C. component signal, and performs A/D conversion. The peak-hold circuit 25a holds maximum value of the error signal input thereto and the bottom-hold circuit 26a holds the minimum value of the error signal input thereto. The differential amplifier 27a amplifies the difference of the minimum and maximum value of the error signal (i.e., dynamic range) to be predetermined level, and the A/D convertor 28a converts the difference signal (dynamic range) to digital signal. The switches $SW_{2a}$ and $SW_{2b}$ change connection of the error signal between a fine gain control block including the BPF 22a, the absolute value calculating circuit 23a and the LPF 24a and a rough gain control block including the peak-hold circuit 25a, a bottom-hold circuit 26a, the differential amplifier 27a and the A/D converter 28a. The gain detecting block 21b has a similar construction as that of the gain detecting block 21a, and includes a BPF 22b, an absolute value calculating circuit 23b, a low-pass filter unit 24b, a peak-hold circuit 25b, a bottom-hold circuit 26b, a differential amplifier 27b, an A/D converter 28b and switches $SW_{2b}$ and $SW_{3b}$. The gain detecting block 21b detects the level of the disturbance signal component which has traveled through the servo loop, and the gain detecting block 21a detects level of the disturbance signal component from the disturbance source 29. In other words, the disturbance signal functions as a reference signal based on which gain of the servo loop is detected.

Figure 5A:
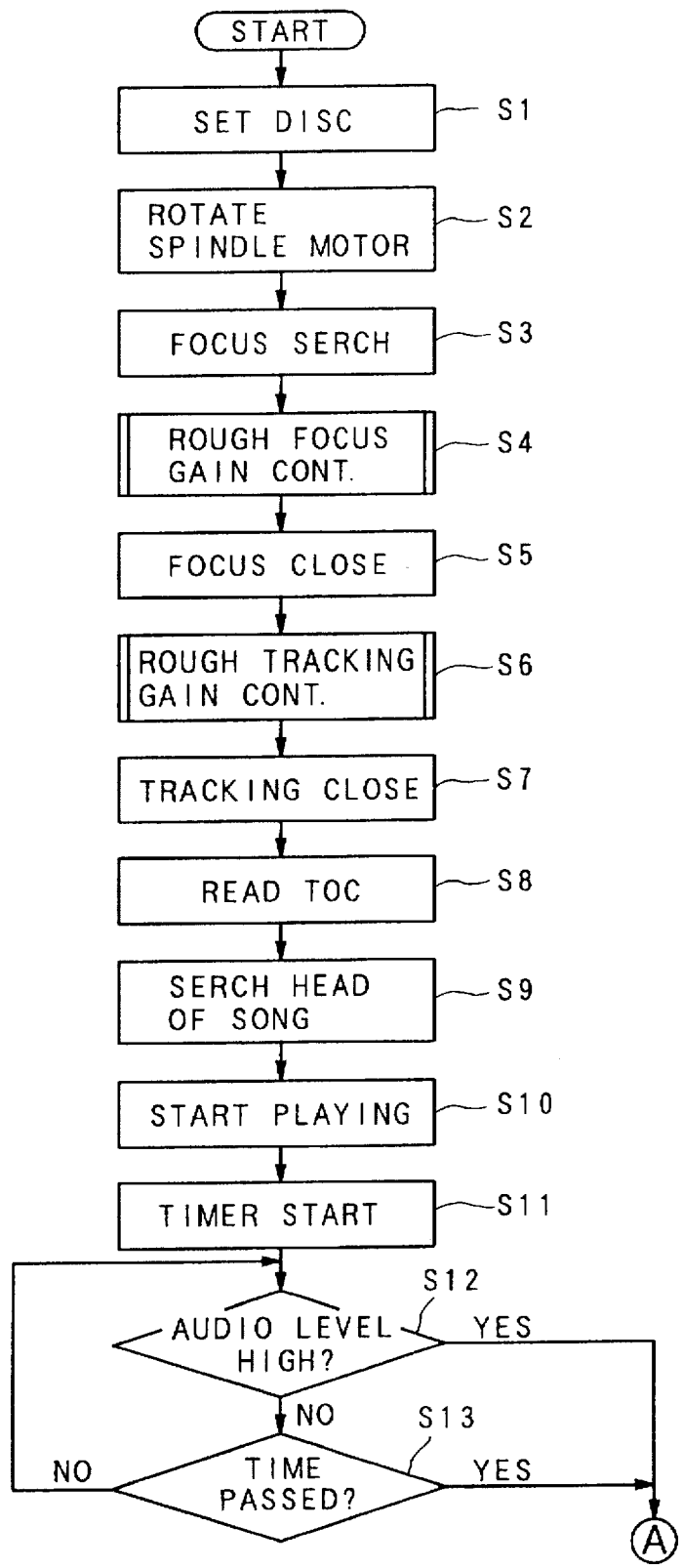
FIGS. 5A and 5B are flowcharts illustrating an operation of the first embodiment.
Figure 5:
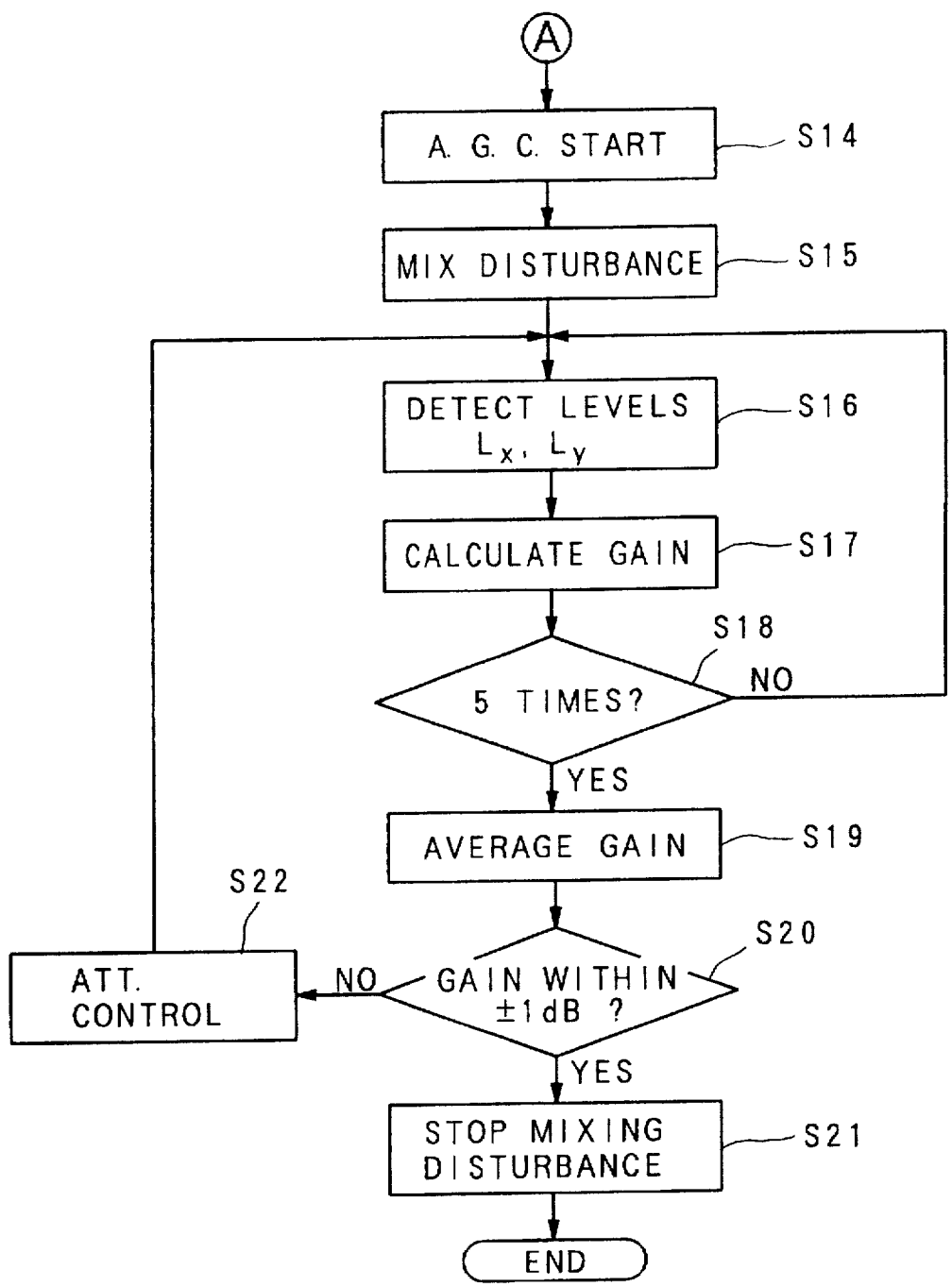
Figure 6A:
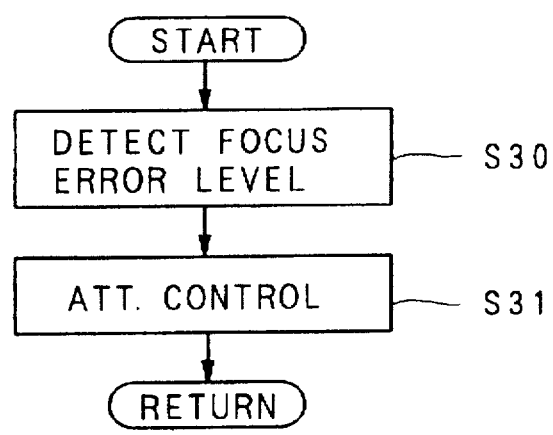
FIG. 6A is a flowchart illustrating operation of rough focus gain control.

Next, an operation of this embodiment will be described with reference to FIGS. 5A and 5B. FIGS. 5A and 5B are flowcharts illustrating an operation of the first embodiment of the present invention. Firstly, a disc is inserted to the CD player 1 (step S1). The micro-computer 6 controls spindle servo system of the servo equalizer 9 to rotate the spindle motor 4 (step S2). Then, the micro-computer 6 begins focus search on the basis of the light beam received by the pickup 2 (step S3). Then, the micro-computer 6 carries out rough control of focus gain to conduct focus servo control (step S4) although an optimum gain cannot obtained at this stage. FIG. 6A is a flowchart illustrating operation of rough focus gain control. In the rough focus gain control, the micro-computer 6 detects level of focus error signal (step S30). This signal is supplied to the gain detecting block 21a (or 21b). The micro-computer 6 controls the switches $SW_{2a}$ and $SW_{3a}$ to select the rough gain control block side (b-terminal side), calculates gain to be supplied to the attenuator 20 in accordance with the dynamic range input by the A/D converter 28a (or 21b), and varies the level of the attenuator 20 by the attenuator control signal $S_1$ (step S31). Namely, the focus error signal FE is obtained as follows:

FE=(peak-hold value)−(bottom-hold value).

Figure 6B:
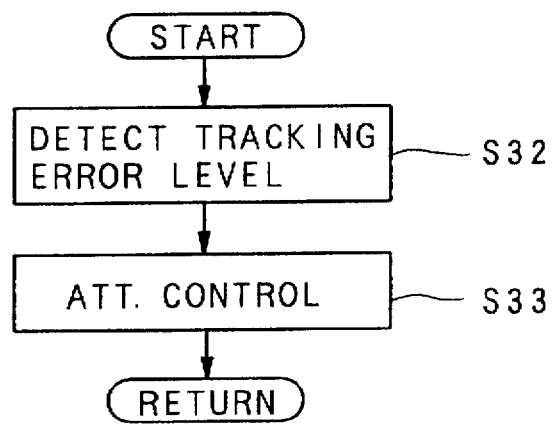
FIG. 6B is a flowchart illustrating operation of rough tracking gain control.

Therefore, gain of the attenuator is obtained by:

ATT gain=(standard target level of FE)/FE, and the attenuator 20 is controlled by this gain value. Then, this subroutine ends. When rough focus servo gain control is completed, focus servo loop is closed (step S5). Subsequently, rough control of tracking servo gain is performed (step S6). FIG. 6B is a flowchart illustrating operation of rough tracking servo gain. It is noted that detailed description of rough tracking servo gain control will be omitted because the operation has the same procedure as that of the rough focus servo gain control described above. Namely, in rough focus servo gain control, tracking error signal TE is detected in step S32, and attenuator gain to be set in the attenuator 20 is calculated by the following equation:

Att gain=(standard target level of TE)/TE.

It is further noted that the above-described rough control of focus servo gain and tracking servo gain are required for a device whose setting range of attenuator is relatively narrow because of its circuit design, and may be omitted in devices of some types.

Subsequently, the tracking servo loop is closed (step S7), and the micro-computer 6 reads out TOC information of the disc (step S8). Then, the CD player searches a head portion of music to be reproduced on the basis of the TOC information thus read (step S9), and reproduction of the music begins (step S10). At this time, the micro-computer 6 starts counting time using a timer whose count time can be freely set by the micro-computer 6 (step S11). This timer is provided to decide a starting time of automatic gain control. In practice, a timer for exclusive use may be used and the operation of micro-computer 6 may be interrupted during counting. Alternatively, the micro-computer 6 itself may count time. Subsequently, the micro-computer 6 discriminates whether an audio level detection signal produced by the audio level detector 7a is supplied or not (step S12). Namely, it is discriminated whether audio signal of music is reproduced and audio signal of a predetermined level is supplied to analog reproduction system or not. If the audio level is higher than a predetermined level (step S12:YES), it means that a level of the musical song output by the speaker 15 becomes higher than a predetermined level, and the micro-computer 6 starts automatic gain control (step S13). Alternatively, if the level of the audio signal is lower than the predetermined level, it means that disturbance signal, possibly heard as noise, output from the speaker 15 is not so large, and the micro-computer 6 discriminates whether the timer has counted time up to the predetermined counting time or not (step S13). If not, the micro-computer 6 continues counting time (step S12). If the timer has counted time up to the counting time before the audio level becomes higher than the predetermined level, the micro-computer 6 starts automatic gain control.

Subsequently, automatic gain control begins (step S14). Firstly, the micro-computer 6 turns on the switch $SW_1$ to supply the disturbance signal to the adder 30 (step S15). At the same time, the micro-computer 6 turns the switches $SW_{2a}$, $SW_{3a}$ and $SW_{2b}$, $SW_{3b}$ to the a-terminal sides, so as to activate fine gain control blocks. Then, the gain detecting block 21a receives, from the terminal point X, the error signal to which the disturbance signal is mixed, and the micro-computer 6 receives output of the gain detecting block 21a and detects the level $L_x$ of the disturbance signal (step S16). Simultaneously, the output of the adder 30 is supplied to the servo equalizer 9, and then delivered to the pickup 2 via the driver 10. The objective lens in the pickup 2 slightly fluctuates according to the disturbance signal. Since the level of the error signal varies non-linearly dependent upon an offset measured from the lens-center of the pickup 2, the level of the error signal varies according to the fluctuation. The error signal returns to the automatic gain control block 8 via the pre-amplifier 5. The micro-computer 6 sets a fixed gain control value (e.g., gain "1") to the attenuator 20 using the attenuator control signal $S_1$. The gain detecting block 21b examines the error signal traveled through the servo loop and reached the terminal point Y, and detects the level $L_y$ of the disturbance signal in the error signal (step S16). The disturbance source 29 generates oscillation signal of a constant frequency and a constant magnitude level, and the band-pass filters 22a and 22b, extract signals having the frequency of the disturbance signal. Therefore, only the signal of the disturbance signal frequency is detected in the gain detecting blocks 21a and 21b even if the error signal includes component of recorded information having other frequency. The gain G of the servo loop is calculated, from the level $L_x$ of the disturbance signal obtained by the gain detecting block 21a and the level $L_y$ of the disturbance signal obtained by the gain detecting block 21b, according to the following equation:

$$G=L_y/L_x$$

These values $L_x$ and $L_y$ are stored in the data buffer 18. Then, the above gain calculation in step S16 is repeated for a plurality of times (5 times in this embodiment), and the number of repetition is counted (step S17). Once the gain calculation is carried out, the counter increments the counting number by one. When the gain calculation is carried out for a predetermined times (step S18:YES), the micro-computer 6 reads out the gain values thus calculated from the memory 13 and takes an average of them (step S19). It is known by experiments that, in order to perform stable servo control, variation of loop gain should be suppressed within a range of ±1dB. In this view, loop gain thus averaged is examined, and if the loop gain is out of the range of ±1dB (step S26:NO), the gain of the attenuator 20 is varied so that the loop gain becomes within the range of ±1dB (step S22), and steps S16 to S20 are repeated. If the loop gain is within the range of ±1dB (step S20:YES), the micro-computer 6 turns off the switch $SW_1$ to terminate mixing the disturbance signal (step S28). Subsequently, the micro-computer 6 stores the gain set to the attenuator 20 at this time in a RAM (not shown), and the operation ends.

Figure 7:
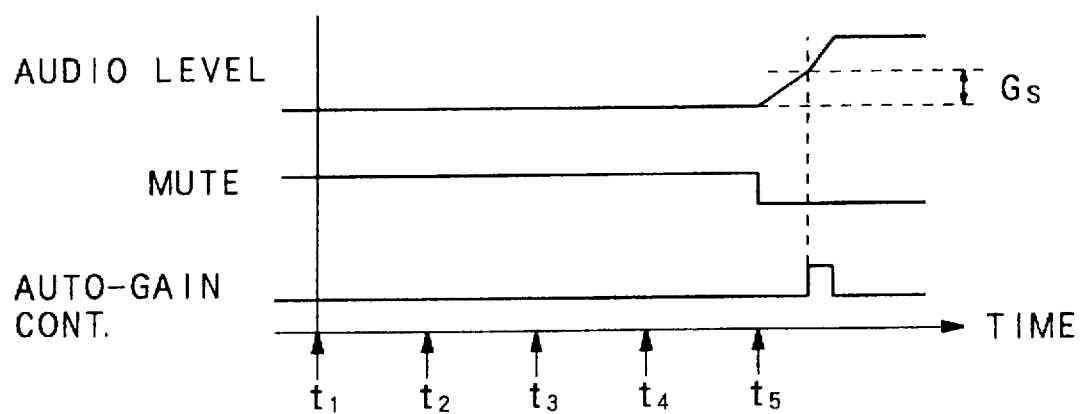
FIG. 7 is a timing chart illustrating operation of the CD player according to the first embodiment.

FIG. 7 is a timing chart illustrating operation of the CD player according to the first embodiment. Assuming that the predetermined audio level judged in step S12 is $G_r$, the search of the head portion of musical song is started at time $t_5$. Then, acoustic sound is output by the speaker 15 after the MUTE signal becomes invalid (Low level), and when the signal processor 7 judges that the audio signal level exceeds the level $G_r$, automatic gain control commences. In this circumstance, since the audio level is higher than the predetermined level $G_r$, disturbance signal component used for automatic gain control can be hardly heard or sensed by listener.

As described above, according to the first embodiment, start timing of automatic gain control is decided in consideration of level of audio signal to be output. Therefore, automatic gain control can be performed without allowing listener to sense disturbance signal as noise. Further, since automatic gain control is started if audio level does not become high within a predetermined time period, servo control is surely carried out. Still further, since gain control value is stored, the stored value may be used next time unless the disc is changed. Therefore, repetition of the same automatic gain control can be avoided and musical song may be reproduced with less delay.

The gain control device according to this embodiment is applicable to various devices. In the above embodiment, audio level is detected by the signal processor 7. However, audio level may be detected in other portion within the device. For example, audio level can be detected by checking, by the micro-computer, high bits of digital audio signal. By doing so, circuit configuration can be simplified. Further, in order to make disturbance signal more difficult to sense, audio signal of a certain frequency is extracted by an analog band-pass filter or the like and the signal of the extracted frequency may be detected.

As described above, according to the first embodiment, rough gain control is carried out in an initial period, and fine gain control by automatic gain control is carried out after level of audio signal becomes high. Therefore, noisy component in reproduced audio signal due to disturbance signal is hard to auditorily sense.

2nd Embodiment

Next, second embodiment of the present invention will be described. In the second embodiment, detecting means for detecting lens position is provided in a CD player, and automatic gain control is carried out only when the lens is positioned within a predetermined area. Automatic gain control is performed for focus servo control and tracking servo control. Automatic gain control in this embodiment mixes a given disturbance signal into servo loop, detects the disturbance signal traveled through the servo loop to measure gain of the servo loop, and controls gain of an attenuator or the like provided in the servo loop so that the gain of the servo loop becomes an appropriate value.

Figure 8:
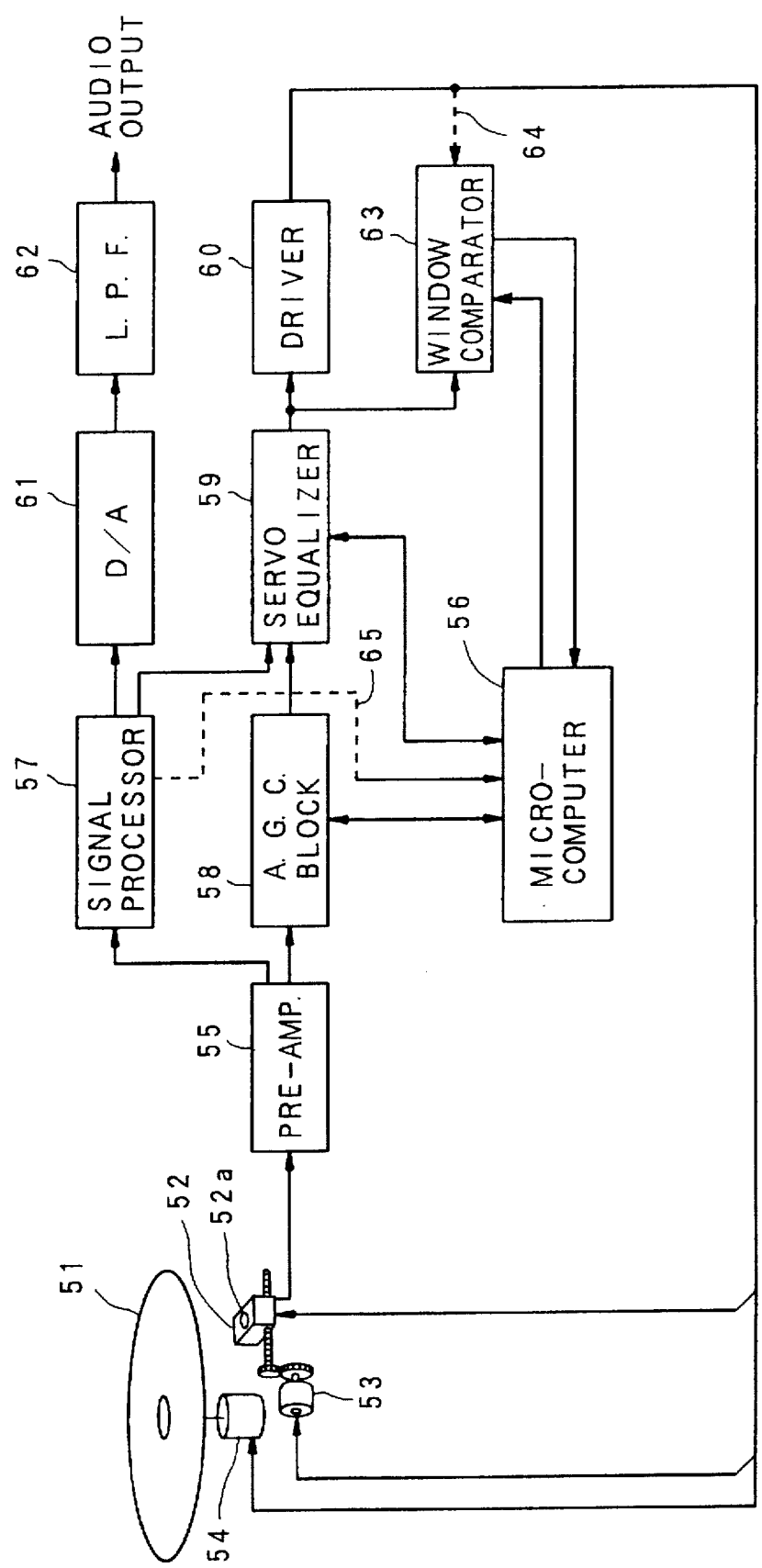
FIG. 8 is a block diagram illustrating a construction of servo system of a CD player according to the second embodiment.

FIG. 8 is a block diagram illustrating a construction of servo system of a CD player according to the second embodiment. The CD player includes a disc 51, a pickup 52, a carriage motor 53, a spindle motor 54, a pre-amplifier 55, a signal processor 57, a D/A converter 61 and a low-pass filter (LPF) 62. These components mainly relate to audio signal demodulation. The disc 5 is a recording medium on which signal is recorded, and the pickup 52 reads out signal from information tracks on the disc 51 via an objective lens 52a. The carriage motor 53 transfers the pickup 52 in a radial direction of the disc 51, and the spindle motor 54 rotates the disc 51. The pre-amplifier 55 amplifies a signal read-out by the pickup 52, and outputs a focus error signal and a tracking error signal in addition to a binary RF signal. The signal processor 57 generates a CLV signal for controlling linear velocity of the spindle motor 54 based on the binary RF signal, carries out EFM modulation and error correction according to CIRC (Cross Interleave Reed-Solomon Code) onto the RF signal to produce 16-bits digital signal, and supplies it to the D/A converter 61. The D/A converter 61 converts the 16-bits digital signal to an analog signal, and the low-pass filter 62 eliminates noise component from the analog signal and passes only audio signal of audible frequency. The CD player further includes an automatic gain control block 58, a servo equalizer 59, a driver 60, a micro-computer 56 and a window comparator 63. These components function servo control. The automatic gain control block 58 varies levels of the error signals supplied from the pre-amplifier 55 to be predetermined signal levels suitable for the servo control, and the servo equalizer 59 adjusts frequency for servo control. The driver 60 carries out current-amplification of the drive signals generated, and drives focus and tracking coil 83 (shown in FIG. 10A) in the pickup 52, the carriage motor 53 and the spindle motor 54. The micro-computer 56 controls whole system, and the window comparator 63 detects position of the objective lens based on the error signal output from the servo equalizer 59. The object lens 52a of the pickup 52 is driven by an actuator (the tracking coil 83) in the radial direction of the disc, and driven by the focus coil 83 to perform focus control. By these servo controls, the pickup 52 is positioned to accurately receive read-out light from the disc 51 and supplies the light to a photo-detecting unit (not shown).

FIG. 9 is a block diagram illustrating a construction of the automatic gain control block 58. The automatic gain control block 58 varies the levels of the error signals supplied from the pre-amplifier 55 to be appropriate for the servo equalizer 59. The automatic gain control block 58 includes an attenuator 70, a gain detecting block 71a, a gain detecting block 71b, a disturbance source 79 and an adder 80. The attenuator 70 varies levels of the error signals on the basis of the attenuator control signal $S_3$ supplied from the micro-computer 56. The attenuator control signal $S_3$ includes gain control signal, and the micro-computer 56 supplies a gain control signal to the attenuator 80 by the attenuator control signal $S_3$. The gain detecting block 71a receives the output of the attenuator 70 from the terminal point Y positioned between the attenuator 70 and the adder 80, and detects the level of the error signal, including disturbance signal, which has traveled through the servo loop shown in FIG. 8. The adder 80 adds the disturbance signal generated by the disturbance source 79 to the output from the attenuator 70. The gain detecting block 71b receives the output of the adder 80, and detects levels of the error signals immediately after the mixing of the disturbance signal. The disturbance source 79 generates disturbance signal having pseudo-constant value (e.g., oscillation signal having constant frequency and constant magnitude level) to be added to the error signal, and supplies the disturbance signal to the adder 80 via the switch $SW_4$ switched by the micro-computer 56. The gain detecting block 71a includes a band-pass filter 72a for extracting the signal having frequency of the disturbance signal component, an absolute value calculation circuit 73a for producing absolute value signal and a low-pass filter 74a for eliminating signal having frequency of the disturbance signal to produce D.C. component signal. The gain detecting block 71b has a similar construction as that of the gain detecting block 71a, and includes a band-pass filter 72b, an absolute value calculating circuit 73b and a low-pass filter 74b. Namely, the gain detecting block 71a detects the level of the disturbance signal component which has traveled through the servo loop, and the gain detecting block 71b detects level of the disturbance signal component from the disturbance source 79. In other words, the disturbance signal functions as a reference signal based on which gain of the servo loop is detected.

Figure 10A:
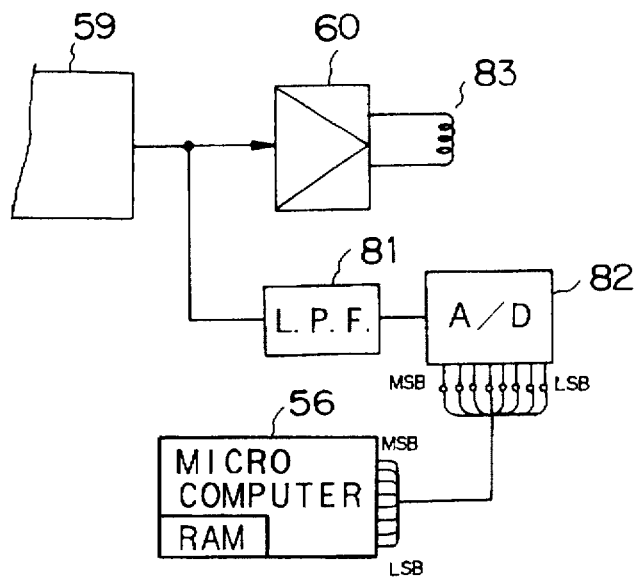
FIG. 10A is a block diagram illustrating a construction the window comparator shown in FIG. 8.

FIG. 10A is a block diagram illustrating a construction the window comparator 63 which receives servo signal from the servo equalizer 9. The window comparator 63 includes a low-pass filter 81 for eliminating high frequency component from the servo signal, and an A/D converter 82 for digitizing the servo signal from the LPF 81 and supplying digitized servo signal to the micro-computer 56.

Figure 11:
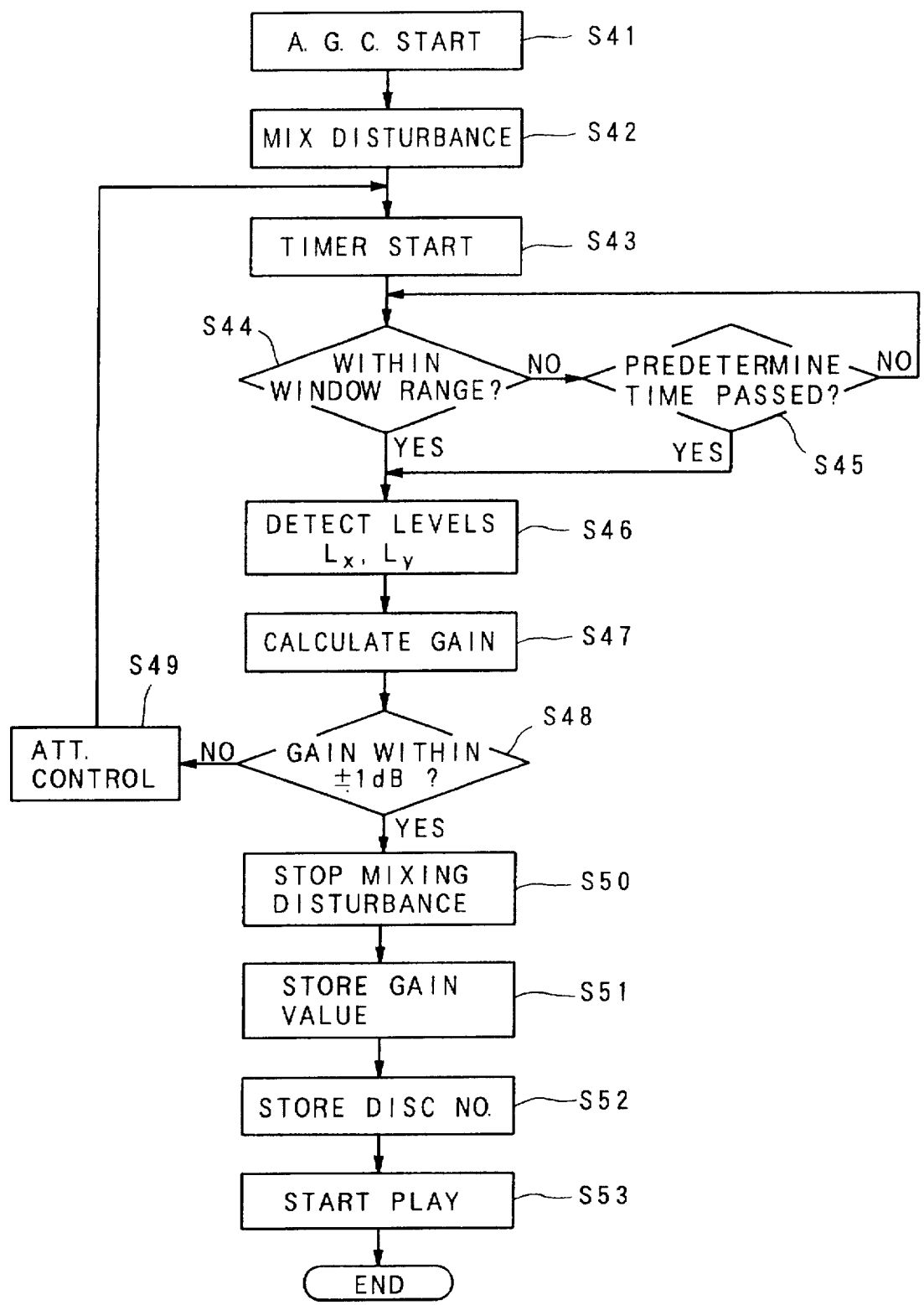
FIG. 11 is a flowchart illustrating an operation of automatic gain control according to the second embodiment.

Next, an operation of the gain control device according to the second embodiment will be described. FIG. 11 is a flowchart illustrating an operation of automatic gain control according to this embodiment. Before starting automatic gain control, following initial operations are carried out. Firstly, the disc 51 is inserted into the CD player. Then, the micro-computer 56 gives an instruction to the servo equalizer 9, and the spindle servo system generates servo control signal. The driver 10 conducts current amplification onto the servo control signal to produce a drive signal, and the spindle motor 4 is rotated according to the drive signal. The pickup 52 reproduces an RF signal from tracks on the disc 51, and the pre-amplifier 55 produces various error signals in accordance with condition of reflected light beam. The RF signal is binarized in the pre-amplifier 55 and is supplied to the signal processor 57. An error signal for rotation velocity control, obtained from modulation frequency of the RF signal, is supplied to the servo equalizer 59 to start servo control, and driving current supplied to the spindle motor 54 is controlled so that the disc 51 rotates at a constant rotation velocity. The pre-amplifier 55 outputs a focus error signal and a tracking error signal, and they are supplied to the automatic gain control block 58. The micro-computer 56 issues an instruction to close the focus and tracking servo loop to the servo equalizer 59, and carriage servo for controlling the carriage motor 53 and focus servo for controlling focus coil in the pickup 52 are carried out. As a result, respective servo controls start, and the pickup 52 is positioned substantially at the lens-center and follows tracks on the disc 51.

Figure 1:
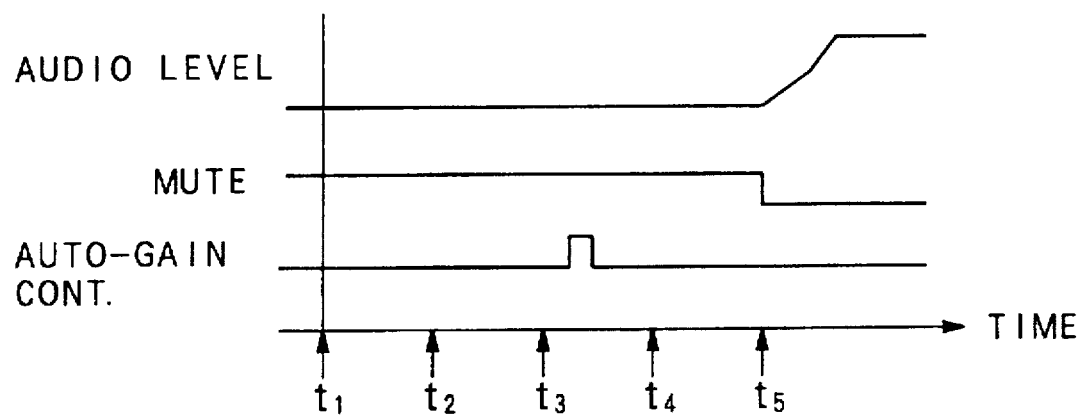
FIG. 1 is a timing chart illustrating operation before a start of reproduction.
Figure 2:
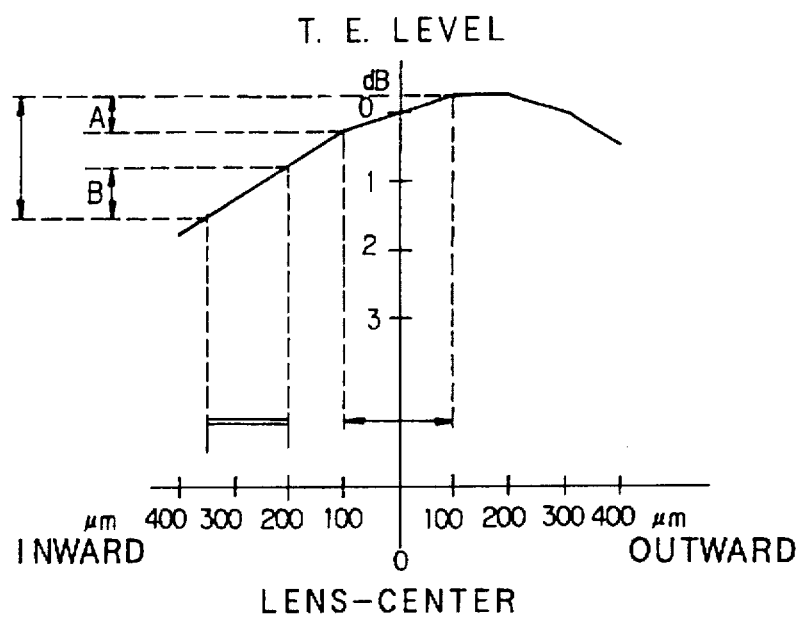
FIG. 2 is a diagram illustrating a relation between a position of an objective lens with respect to a pickup and a level of error signal.
Figure 10B:
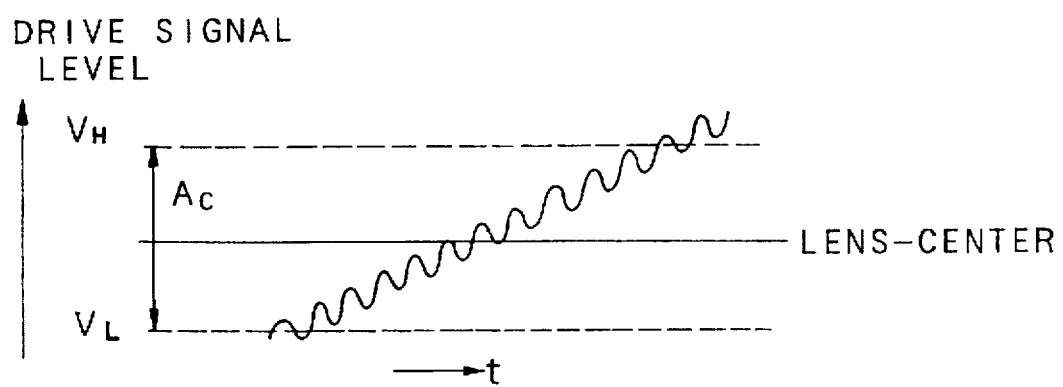
FIG. 10B is a diagram illustrating a waveform of drive signal.

When the above initial operations are completed, automatic gain control commences (step S41). Firstly, the micro-computer 56 turns on the switch $SW_4$ to supply the disturbance signal from the disturbance source 79 to the adder 80 (step S42). Then, the micro-computer 56 makes a timer provided therein start counting (step S43). Then, the error signal to which the disturbance signal is mixed is supplied to the servo equalizer 59 via the terminal X and further delivered to the pickup 52 via the driver 60. Dependent upon the disturbance signal, the lens 52a is driven and slightly fluctuates. Since the level of the error signal non-linearly varies, as shown in FIG. 2, in accordance with the offset of the lens position measured from the lens-center of the pickup 52, the error signal varies depending on the small fluctuation of the lens. The error signal is supplied to the automatic control block 58 again via the pre-amplifier 55. The micro-computer 6 sets gain of the attenuator 70, by the attenuator control signal $S_3$, to be a fixed value (e.g., "1"). The micro-computer 56 receives, from the window comparator 63, a digital error signal. As seen from FIG. 10A, in the window comparator 63, a drive signal of the pickup 52 to which an offset voltage is added is converted by A/D conversion, and the micro-computer 56 judges based on variation of the drive signal, whether the pickup 52 is positioned within a predetermined area or not. This method is advantageous in that the predetermined range of the drive signal is easily alterable. The drive signal has a waveform as illustrated in FIG. 10B and varies from the lens-center. When voltages $V_L$ and $V_H$ are determined so that the range A in FIG. 2 coincides with the range $A_c$ of the drive signal shown in FIG. 10B, the micro-computer 56 can recognize whether the drive signal value is within a predetermined range or not. The range of the predetermined output signal will be hereinafter referred to as "window range". By the above operation, it is discriminated whether the drive signal is within the window range or not, that is, the lens 52a of the pickup 52 is positioned within a given range from the lens-center or not (step S44). The window range is an optimum range for controlling gain of the error signal.

If the drive signal is out of the window range (step S44: NO), it is discriminated whether the timer counts up to the predetermined time or not (step S45). If step S45 is NO, the discriminations of steps S44 and S45 are repeated. If the timer counts up to the predetermined time period (step S45:YES), it is presumed that eccentricity of disc is too large or characteristics of servo systems are irregular, and hence automatic gain control is started with this condition. Alternatively, if the drive signal is within the window range (step S44:YES), the gain control block 71b detects the level of the disturbance signal from the error signal picked up at the terminal X and the gain control block 71a detects the level of the disturbance signal from the error signal traveled through the servo loop and picked up at the terminal Y (step S46). Although the disturbance source 79 generates a disturbance signal having a constant magnitude and a constant frequency, the BPF 22 extracts only signal having the same frequency as the disturbance signal, and therefore the gain control blocks 71a and 71b can detect the level of only the signal having the same frequency as the disturbance signal even if information is recorded on the tracks of the disc. If it is detected in step S44 that the variation of the error signal level is within the window range, the error signal level in the range A of FIG. 2 is detected. This means that the pickup is positioned within the predetermined area in the vicinity of the lens-center, as shown in FIG. 2. On the other hand, even if the error signal level does not become within the window range before the timer counts to the predetermined time, automatic gain control is carried out and error signal level in an area other than the area A (e.g., area B in FIG. 2) is detected. It is generally known from experiments that error signal level appropriate for servo system is substantially within ±1dB. The micro-computer 56 calculates gain of the servo loop on the basis of the disturbance signal levels detected by the gain control blocks 71a and 71b(step S47),
and discriminates whether the loop gain is within 1dB or not (step S48). If the loop gain is not within ±1dB (step S48:NO), the micro-computer 56 varies the gain of the attenuator 70, by the attenuator control signal $S_3$, to control the loop gain (step 49), and then repeats the operation of steps S43 to S48. Alternatively, if the loop gain is within ±1dB (step S48:YES), the micro-computer 56 turns off the switch $SW_4$ to terminate mixing the disturbance signal to the error signal (step S50). Subsequently, the gain set to the attenuator 70 is stored in a RAM 6 (step S51). Then, if the CD player is of magazine type, number of disc reproduced is also stored (step S52). Storage of control value in steps S51 and S52 is advantageous not only in continuing reproduction of the same disc but also in reproduction using a magazine type player, as described later. When the automatic gain control of the error signal is completed, disc reproduction is started (step S53).

As described above, according to the second embodiment, a window comparator is introduced to detect position of lens relative to pickup, and the positional information thus detected is used for gain control of servo loop. Therefore, gain of servo loop can be accurately set so that drive signal varies only in the range ±1dB and servo control can be stabilized. Further, if peak point of drive signal deviates from the center (zero-point) of offset value of lens with respect to pickup, due to variation of mechanical characteristic value of pickup, lens or the like (FIG. 2 shows this phenomenon), values $V_H$ and $V_L$ defining window range can be appropriately altered to slide the window range, and hence optimum gain control can be performed for discs having various characteristics. Still further, gain control value is stored and can be used for later reproduction of the same disc. Therefore, repetitive gain control operation can be omitted and reproduction can be started with less delay time.

Figure 12:
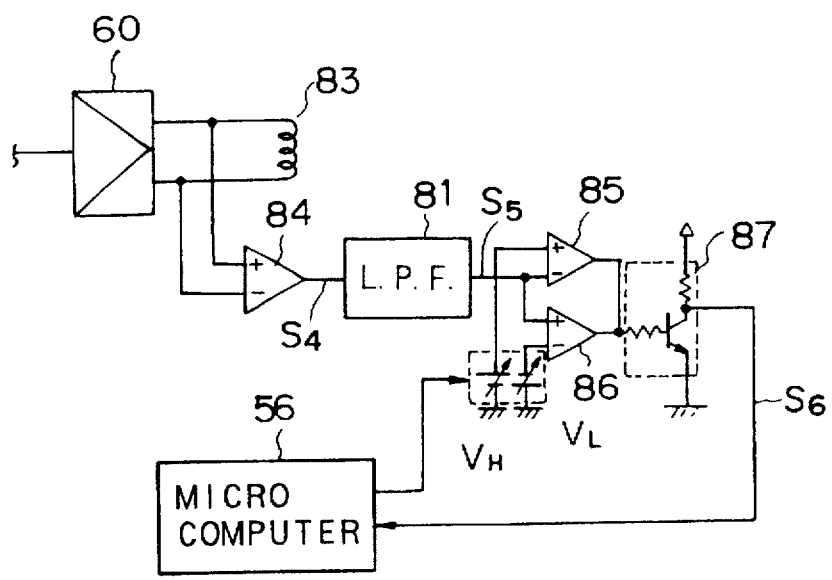
FIG. 12 is a block diagram illustrating construction of a window comparator according to one modification of the second embodiment.

Next, a modification of the second embodiment will be described. In this modification, CD player is provided with a window comparator in which voltages $V_H$ and $V_L$ defining window range is alterable. This is different from the window comparator shown in FIG. 10A in which the micro-computer 56 simply detects A/D converted drive signal. Construction of CD player according to this modification is identical to that shown in FIGS. 8 and 9, and therefore detailed description will be omitted. FIG. 12 is a block diagram illustrating construction of a window comparator according to a modification of the second embodiment. As shown in FIG. 12, drive signals input to the window comparator are picked up from the both sides of the focus/tracking coil 83. Namely, drive signals are supplied to the window comparator 63 via the line 64 (dotted line, see. FIG. 8). In the window comparator 63 shown in FIG. 12, the driver 60 supplies drive signal to the coil 33. Comparator unit includes comparators 84, 85 and 86, a LPF 81 and a switch 87. The comparator 84 compares voltage of both sides of the coil 83 with each other. The LPF 81 eliminates high-frequency components from signal output by the comparator 84, and shapes waveform of the signal from the comparator 84 to be appropriate for subsequent window comparison. The comparators 85 and 86 constitute a window comparator which compares the signal from the LPF 81 with the reference voltages $V_H$ and $V_L$, and outputs H-level signal when the signal input is higher than the reference voltage $V_L$ and lower than the reference voltage $V_H$. The switch 87 includes a transistor and resistors, and becomes ON state and outputs L-level signal when the output of the window comparator is H-level.

Next an operation will be described. An operation of this modification for automatic gain control is identical to that of the second embodiment shown in FIG. 11 except for the operation of window comparison in step S44. According to this modification, window comparison is executed in the following manner. The comparator 84 detects and amplifies a difference of voltages at the both sides of the coil 83, and the LPF 81 eliminates noisy component resulting from the eccentricity due to the disc rotation. The comparators 85 and 86 compare the signal from the LPF 81 with reference voltages $V_H$ or $V_L$, respectively. These reference voltages are alterable by the micro-computer 56. The switch 87 becomes ON state only when the signal from the LPF 81 in within the window range defined by the reference voltages $V_H$ and $V_L$. Therefore, signal supplied to the micro-computer 56 becomes L-level when the drive signal is within the window range and becomes H-level when the drive signal is out of the window range. The micro-computer 56 recognizes, from the signal $S_6$, that the drive signal $S_5$ is within the window range. In this modification the above described discrimination is carried out in step S4 (in FIG. 11).

As described above, according to this first modification, window comparison is performed by a simple circuitry. Further, since the micro-computer 56 receives pulse signal $S_6$ and does not perform comparison, automatic gain control can be rapidly carried out. Still further, the window range can be readily and freely altered by simply setting the reference voltages $V_H$ and $V_L$.

Next, another modification of the second embodiment will be described. In this modification, the above described device is applied to a magazine-type CD player. Specifically, gain controls for every CD in the magazine are carried out like the manner of the second embodiment. According to this modification, a magazine-type CD player stores gain control values for each CDs in the magazine, and the stored gain control values are used for plays of every CDs later on. Construction of the CD player is identical to that of the CD player shown in FIG. 8 except for that the CD player of this modification includes a magazine for storing plural CDs and a memory section for storing gain control values for each CDs.

Figure 13:
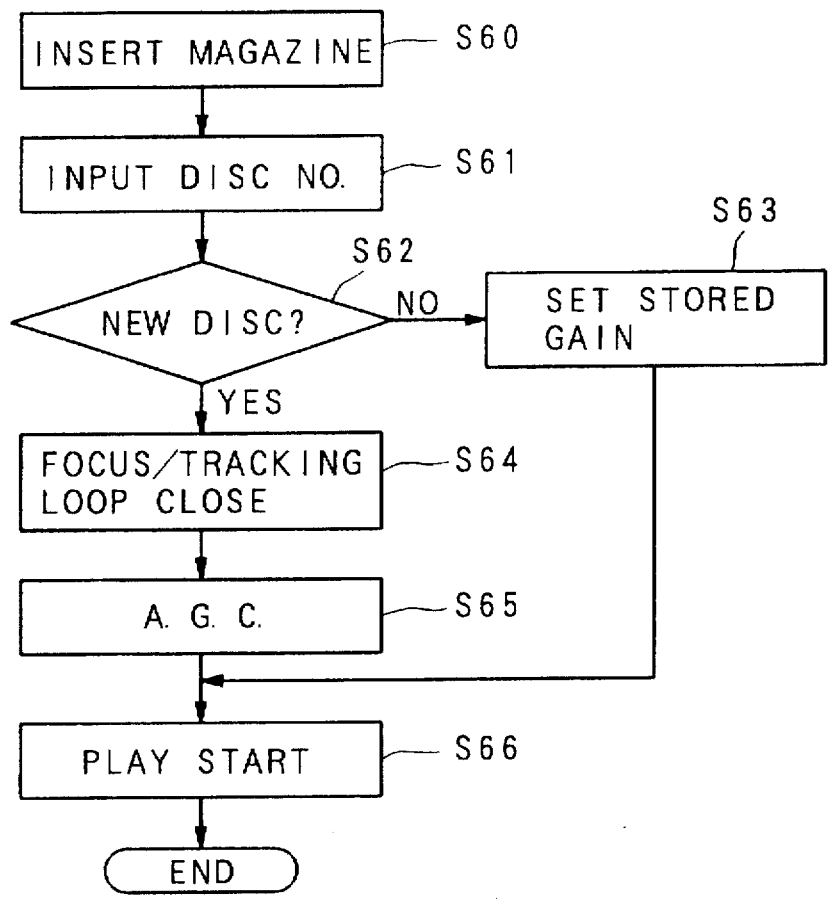
FIGS. 13A and 13B are flowcharts illustrating operations of reproduction according to another modification of the second embodiment.
Figure 13:
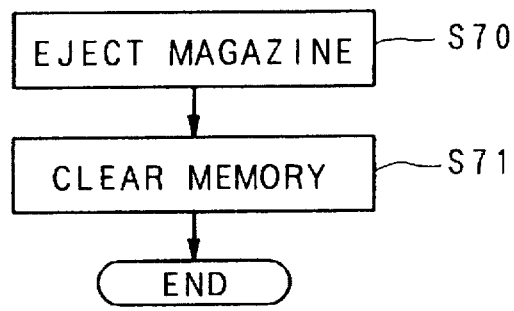

Next, an operation of this modification will be described. FIG. 13A is a flowchart illustrating an operation of reproduction. In step S60, a magazine in which plural (e.g., five) discs are installed is inserted into the CD player, and then user inputs a number of disc desired to be reproduced (step S31). The discs in the magazine are assigned to disc numbers which are decided according to insertion position in the magazine. Then, the micro-computer 56 discriminates whether the disc is reproduced for the first time or not by using the disc number (step S62). If the disc was reproduced in the past (step S62:NO), the micro-computer 56 reads out, from a memory, gain control value of the disc which was calculated in a previous reproduction and sets the gain of the attenuator 70 (step S63). Then, the disc is reproduced (step S66). Alternatively, if the disc is reproduced for the first time (step S62:YES), the focus servo loop and the tracking servo loop are closed (step S65), and automatic gain control is started (step S65). The automatic gain control is carried out in the manner shown in FIG. 11. It is important to note that gain control value calculated and the number of the disc are stored in steps S51 and S52 in FIG. 11. When the automatic gain control is completed, disc reproduction commences (step S66). On the other hand, when the magazine itself is to be changed, gain control values stored for the discs in the magazine becomes invalid. FIG. 13B is a flowchart illustrating this operation. When the user instructs to eject the magazine, the player separates the magazine mechanically and electrically (step S70). Then, the gain control values stored in the memory is cleared (step S41). As described above, according to this modification, gain control values for the discs in the magazine can be repeatedly used unless the magazine is changed.

The second embodiment described above can be applied to various devices. Although the above description is directed to an application of gain control device to tracking servo control, it is also applicable to focus servo control. Since focus servo control can be performed separately from tracking servo control, one of them can be carried out after the other is completed, thereby both servo controls can be accurately performed. In addition, window comparator and automatic gain control block are not limited to the above described circuit configuration and may be configured in other specific form. Namely, the present invention requires a window comparator capable of detecting lens position in the vicinity of lens-center and an automatic gain control block in active when drive signal of pickup is within the window range. Further, the device is applicable not only to CD but LD or magneto-optical disc in which servo control is carried out based on an error signal.

As described above, according to the second embodiment, automatic gain control is carried out only when the lens is in the vicinity of lens-center, and therefore gain control is stabilized. In addition, even though optimum gain position deviates from the lens-center, due to variation of physical characteristics of the lens, range for automatic gain control can be arbitrarily set in consideration of the deviation, thereby stable servo control is guaranteed.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. An automatic gain control device comprising:
   reading means for reading an information signal from a recording medium;
   a lens movably provided on the reading means;
   a servo loop including servo control means for controlling positions of the reading means and the lens with respect to the recording medium;
   position detecting means for detecting a relative position of the lens with respect to a center of a movable range of the lens on the reading means; and
   gain control means for detecting and varying the gain of the servo loop in a time period determined on the basis of a result detected by said position detecting means, wherein said gain control means controls the gain of the servo loop in the time period when the position detecting means detects that the lens is positioned within a predetermined position range defined from the center of the movable range of the lens on said reading means.

2. An automatic gain control device according to claim 1, wherein said position detecting means comprises window comparator for detecting the relative position of the lens on the basis of a level of an error signal in the servo loop.

3. An automatic gain control device according to claim 1, wherein said window comparator comprises an A/D converter for digitizing the error signal and a micro-computer for detecting the position of the lens based on the digital error signal.

4. An automatic gain control device according to claim 2, wherein said window comparator comprises comparators for comparing the error signal with predetermined reference values.

5. An automatic gain control device according to claim 1, further comprising a storage means for storing a gain control value of a servo loop for each disc of a plurality of discs with a number identifying each disc when said plurality of discs, in a magazine, are used in the device, so that the stored gain control values are used for later plays of said discs.

6. An automatic gain control device according to claim 1, further comprising disturbance source for generating a disturbance signal and mixing the disturbance signal to the servo loop, and said gain control means detecting the gain of the servo loop on the basis of the level of the disturbance signal.

7. An automatic gain control device according to claim 1, wherein said reading means comprises an optical pickup, and said detecting means detects whether the positional deviation of the lens from the center of the movable range exceeds a predetermined distance.

8. An automatic gain control device comprising:
   a reading means for reading information signal from a recording medium;
   a lens movably provided on the reading means;
   a servo loop including servo control means for controlling positions of the reading means and the lens with respect to the recording medium;
   a position detecting means for detecting a relative position of the lens with respect to a center of a movable range of the lens on the reading means;
   a gain control means for detecting and varying the gain of the servo loop and for controlling the gain of the servo loop based on a result of a detection by said position detecting means; and
   a storage means for storing gain control value of servo loop for each disc of a plurality of discs with a number identifying the disc when said plurality of discs, in a magazine, are used in the device so that the stored gain control values are used for later plays of said discs.

9. An automatic gain control device comprising:
   A reading means for reading information signal from a recording medium;
   a lens movably provided on the reading means;
   a servo loop including servo control means for controlling positions of the reading means and the lens with respect to the recording medium;
   a position detecting means for detecting a relative position of the lens with respect to a center of a movable range of the lens on the reading means; and
   a gain control means for detecting and varying the gain of the servo loop and for controlling the gain of the servo loop based on a result of a detection by said position detecting means; and
   a disturbance source for generating a disturbance signal and mixing the disturbance signal with the servo loop, said gain control means detecting the gain of the servo loop on the basis of the level of the disturbance signal.

* * * * *